United States Patent

[11] 3,597,762

[72] Inventor Paul L. DiMatteo
Plainedge, N.Y.
[21] Appl. No. 171,533
[22] Filed Feb. 6, 1962
[45] Patented Aug. 3, 1971
[73] Assignee The United States of America as
represented by the Secretary of Navy

[54] INSTANTANEOUS RANGE CIRCUIT
4 Claims, 2 Drawing Figs.
[52] U.S. Cl. .............................................. 343/18 E,
343/11
[51] Int. Cl. .................................................. G01s 7/36
[50] Field of Search ............................................ 343/18, 7.4,
11, 5, 18 E

[56] References Cited
UNITED STATES PATENTS
3,184,739  5/1965  Franklin et al. ............... 343/18 E X
3,224,002  12/1965  Carre ........................... 343/18 E
3,242,490  3/1966  Wentworth et al. ............ 343/18 E UX Primary Examiner—T. H. Tubbesing
Attorneys—R. S. Sciascia and T. O. Watson, Jr.

ABSTRACT: This invention relates to a counter-countermeasure for use in radar systems and more specifically to a circuit which is capable of giving an indication of the range of a target notwithstanding the fact that the target is jamming the radar equipment.

INVENTOR
Paul L. DiMatteo
BY
ATTORNEYS

INVENTOR
Paul L. DiMatteo

INSTANTANEOUS RANGE CIRCUIT

It is well known that it is possible to cause radar equipment to malfunction by deliberately subjecting the radar receiving equipment to microwave radiations from an external transmitter. This practice is commonly known as "jamming." By such jamming the radar equipment will malfunction by causing it to give a false indication or to give no indication even when the target is within range. In cases where the radar equipment has locked on the target in a tracking operation the jamming signal may cause the radar equipment to release its lock on the target and to, in turn, lock on the jamming signal, thus rendering fire control systems impotent.

It is known that in order for such jamming to be effective at all, the jamming transmitter must operate on the same microwave frequency as the operating frequency of radar equipment to be jammed. In order to insure this, the jamming transmitter must pause at brief intervals to sample the radar's transmitting frequency in order to determine the proper frequency to jam. It is the purpose of this invention to take advantage of this sampling period to extract the range information of the target and to retain it for a predetermined period of time and during subsequent sampling periods extract new range information for processing in the radar system.

Accordingly it is a main object of this invention to provide target range information to radar equipment not withstanding the fact that the target is jamming the radar equipment.

Another important object of the invention is to render radar equipment insensitive to jamming signals and thereby prevent false indications and other malfunctions of the designation equipment associated with the radar equipment.

Various other objects and advantages will be apparent from the following description of one embodiment of the invention, and the novel features will be particularly pointed out hereinafter in connection with the appended claims.

Figure 1:
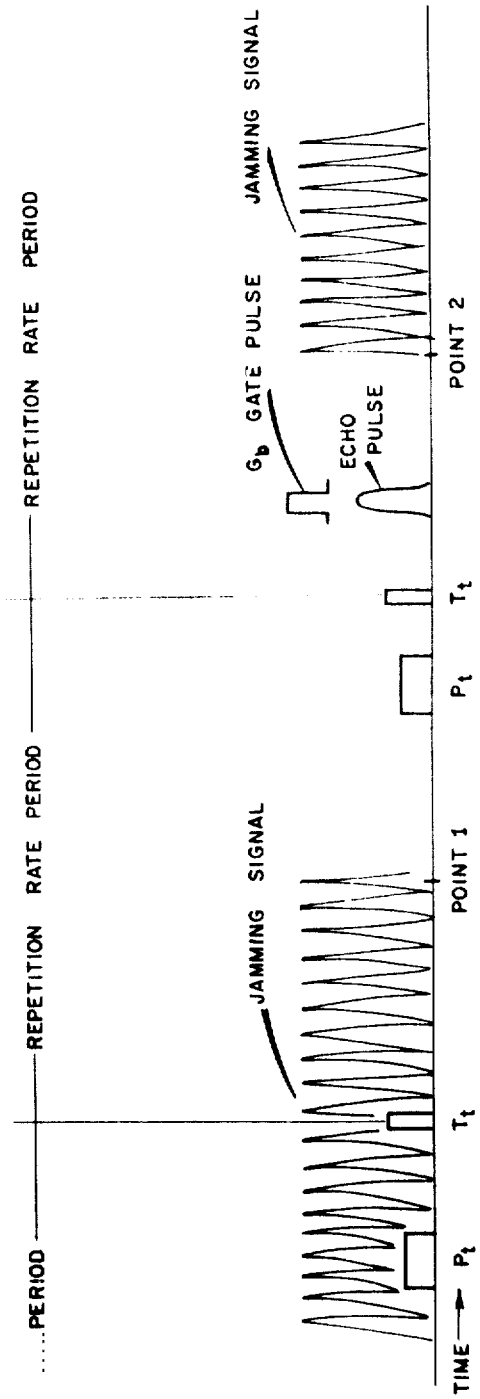
FIG. 1 is a graphical illustration of the time sequence of operation of FIG. 2.
Figure 2:
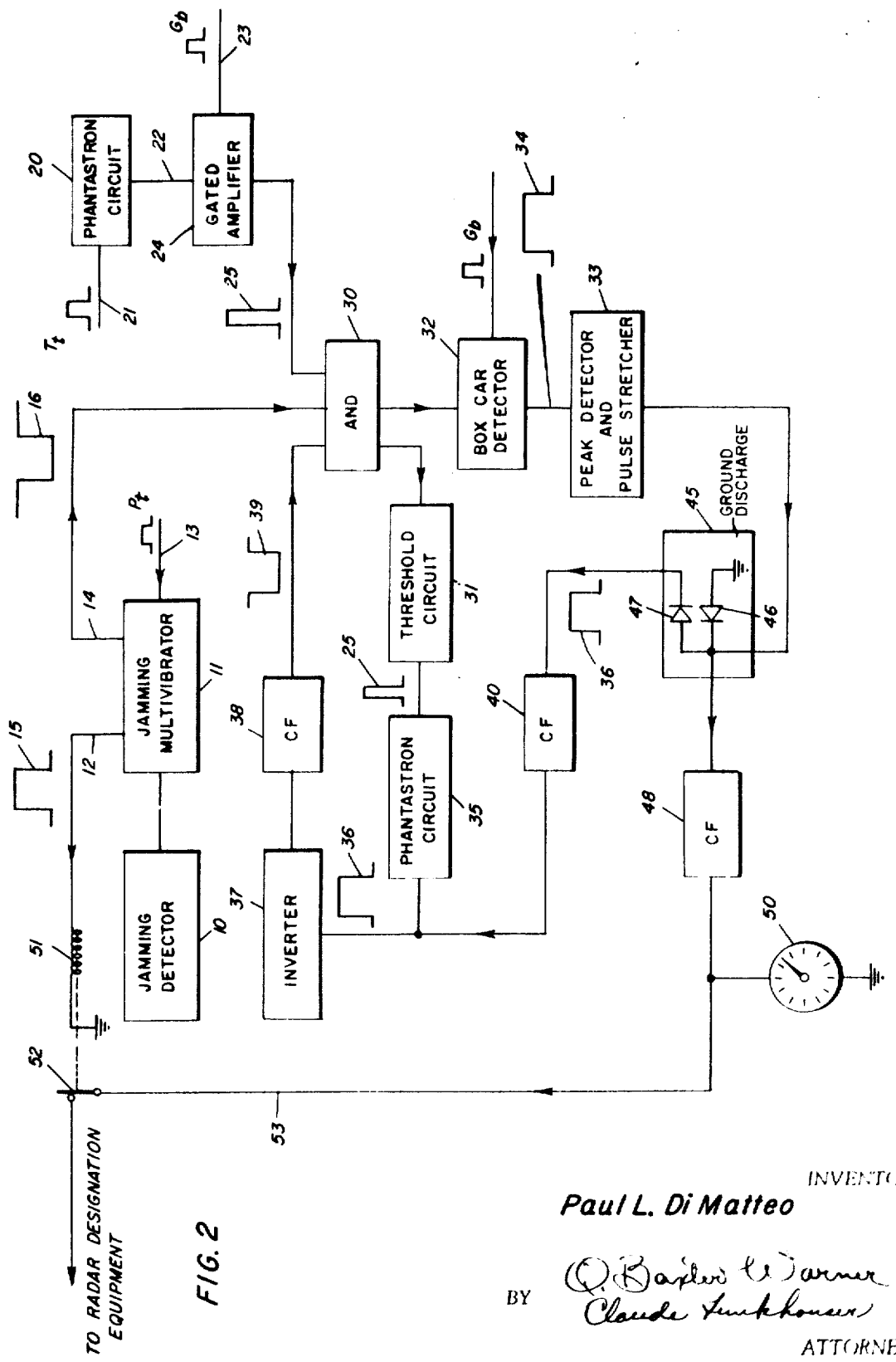
FIG. 2 is a circuit diagram embodying the invention.

Referring first to FIG. 1, a graphical illustration shows the timing sequence of operation of the circuit of FIG. 2. Each repetition rate period initiated by pulse $T_r$ represents the time period required for each sweep cycle of the radar system. As illustrated by pulse $P_r$, once during each repetition rate period, jamming detector 10 and jamming multivibrator 11 shown in FIG. 2 operate to indicate whether or not jamming occurred during that period. Point 1 indicates the point in time when the jamming signal transmitter is shut off to provide sampling time to determine the operating frequency of the radar system and point 2 indicates the point in time when jamming is resumed. In modern jamming equipment the time period between points 1 and 2 is usually 3 to 4 milliseconds and the sampling rate is usually once every 40 milliseconds.

Referring now to FIG. 2 block 10 illustrates a jamming detector which senses and indicates reception of jamming signals. The detector may take the form of a signal-to-noise detector wherein reception of a radar signal is distinguishable from a jamming signal. A disclosure of this type of detector appears in U.S. Pat. No. 2,910,691 issued Oct. 27, 1959, however it is understood that any jamming detector may be used within the scope of the subject invention. The output of the jamming detector 10 is fed to one side of jamming multivibrator 11 to set the corresponding output 12 to a high level when a jamming condition is sensed by the detector. The multivibrator 11 is interrogated on line 13 by a reset pulse $P_r$ shown also in FIG. 1 once each repetition rate period to determine if jamming is taking place at that instant. If jamming has not resumed at the termination of the reset pulse $P_r$, the multivibrator remains in the reset condition with output line 14 high and output line 12 low. Upon resumption of jamming an output from the jamming detector 10 flips the multivibrator 11 to the set condition rendering output line 12 high while output line 14 is low. Thus, it is obvious that since multivibrator 11 is a bistable device it acts in effect like a switch to determine if an output signal will appear on line 12 or line 14. In the absence of jamming or an interrogating pulse $P_r$, multivibrator 11 continues to produce a strong signal, as 16, on line 14, where it is processed by the remainder of the circuit and ultimately delivered to the radar designation equipment through relay contact 52. The complimentary outputs of multivibrator 11 are graphically indicated as 15 and 16.

At the beginning of each repetition rate period, operation of the phantastron circuit 20 is initiated by a pulse $T_r$ on line 21. This circuit operates in synchronism with the sweep cycle of the radar system in a well known manner to provide an output on line 22 proportional in magnitude to the instantaneous range of a target. Gate pulses $G_b$ coincident with the target position in range as indicated in FIG. 1 are employed at line 23 to gate amplifier 24 to pass a pulse 25 of magnitude proportional to the instantaneous range of that particular target to AND circuit 30.

Assuming for the moment that phantastron circuit 35 is inactive, AND circuit 30 will pass the pulse output from amplifier 24 when the output line 14 of multivibrator 11 is high or in other words when an absence of jamming was sensed upon interrogation of the multivibrator by reset pulse $P_r$. The output from the AND circuit 30 is fed jointly to a threshold circuit 31 and to a "box car" detector 32 which is gated by pulse $G_b$ once each repetition rate period in the same manner as amplifier 24. The output from the "box car" detector is fed to a peak detector and stretcher 33. The combined function of the "box car" detector 32 and peak detector and stretcher 33 is to stretch the waveform of the pulse passed by AND circuit to extend over approximately one repetition rate period while maintaining the amplitude proportional to the range of the target as graphically illustrated at 34. The threshold circuit 31 to which the output of the AND circuit 30 is also fed is adapted to pass a signal having a value greater than 0 volts to phantastron circuit 35. This circuit when activated produces an output pulse graphically illustrated at 36 having a 2-second time duration. This output pulse is inverted in inverter circuit 37 and applied through cathode follower circuit 38 as an inhibit pulse 39 to AND circuit 30. When phantastron circuit 35 is inactive, the inverter serves to apply a positive pulse to partially enable AND circuit 30. Therefore, it can be seen that only one pulse can pass through AND circuit 30 and then only during periods when the radar system is not being jammed.

The outputs from the phantastron 35 and the peak detector and stretcher 33 are each fed to a ground discharge indicated at 45. The function of this circuit which includes diode 46 and 47 is to pass any output from peak detector and stretcher 33 to ground during periods when the phantastron circuit 35 is inactive. However during the 2-second period when the output of phantastron circuit 35 applied through cathode follower 40 is high, the output from the peak detector and stretcher circuit 33 is coupled through cathode follower circuit 48 to a peak reading meter 50 which registers the range of the target for the duration of one repetition rate period.

Returning to jamming multivibrator 11, a relay coil 51 is connected to output line 12 such that the relay is operated during periods when the radar system is being jammed. Contact 52 operably associated with relay coil 51 is deployed in output line 53 to connect the output of cathode follower 48 to the radar designation equipment, not shown, during periods when the radar system is not being jammed.

Operation of the circuit of FIG. 2 is apparent from the foregoing description, however it should be appreciated that the invention provides a relatively simple circuit arrangement whereby the derogatory effects of jamming on a radar system are avoided. The AND circuit 30 is disabled by multivibrator 11 to prevent the jamming signal from being processed by the radar equipment. Further precautionary means included the phantastron circuit 35 which disables AND circuit 30 thus permitting only a single pulse to pass there through and in addition controls the ground discharge circuit 45 to prevent spurious signals from effecting the meter 50.

What I claim is:

1. A circuit for use with a radar system which is subject to being jammed by an external signal transmitter carried by a target comprising detector means for detecting the existence of a jamming signal, a multivibrator connected to said detector means and having first and second output lines, an input line connected to said multivibrator for cyclically interrogating said multivibrator to establish a positive voltage level on said second output line during periods when jamming does not occur, means for deriving a voltage pulse of magnitude proportional to the range of said target, coincidence circuit means connected to said second output line for passing said voltage pulse only during periods when jamming does not occur, phantastron circuit means responsive to the voltage pulse passed by said coincidence circuit for inhibiting the latter, peak detecting and pulse stretching circuits connected to said coincidence circuit for stretching said voltage pulse while maintaining the amplitude proportional to the range of said target, a ground discharge circuit connected to the output of said peak detector and pulse stretcher circuits and to the output of said phantastron circuit for passing said stretched voltage pulse when said coincidence circuit is inhibited and a meter connected to said ground discharge circuit and responsive to said stretched voltage pulse for registering the range of said target.

2. In the circuit defined in claim 1, a relay means energized by a positive voltage level on said first output line of said multivibrator for passing said stretched voltage pulse to the radar designation equipment during said periods when the radar system is not being jammed.

3. A circuit for use with a radar system which is subject to being jammed by an external signal transmitter carried by a target comprising means for detecting the presence of a jamming signal, means responsive to said detecting means and a periodic interrogation signal for developing an enabling output only during periods when jamming does not occur, means for deriving a voltage pulse of magnitude proportional to the range of said target, coincidence circuit means responsive to said enabling output for passing said voltage pulse, inhibit means responsive to said passed voltage pulse for disabling said coincidence circuit, means connected to said coincidence circuit for retaining said passed voltage pulse for a predetermined period of time and means responsive to said retained voltage pulse for indicating the range of said target over said predetermined period of time.

4. A circuit for use with a radar system which is subject to being jammed by an external signal transmitter carried by a target comprising detector means for detecting the existence of a jamming signal, a multivibrator connected to said detector means and having an output line, an input line connected to said multivibrator for cyclically interrogating said multivibrator to establish an enabling output on said output only during periods when jamming does not occur, means for deriving a voltage pulse of magnitude proportional to the range of a target, a coincidence circuit responsive to said enabling output for passing said voltage pulse, means connected to said coincidence circuit for retaining the passed voltage pulse for a predetermined period of time and indicating means responsive to said retained voltage pulse for indicating the range of said target.